United States Patent
Ko

(10) Patent No.: US 7,210,704 B2
(45) Date of Patent: May 1, 2007

(54) KNEE BOLSTER OF VEHICLE

(75) Inventor: Chang-Seong Ko, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 317 days.

(21) Appl. No.: 11/024,420

(22) Filed: Dec. 30, 2004

(65) Prior Publication Data

US 2006/0038389 A1    Feb. 23, 2006

(30) Foreign Application Priority Data

Aug. 17, 2004   (KR) .................. 10-2004-0064869

(51) Int. Cl.
*B60R 21/02* (2006.01)
*B60R 21/045* (2006.01)

(52) U.S. Cl. .............. 280/748; 280/751; 280/752

(58) Field of Classification Search ............ 280/752, 280/751, 749; 296/190.01, 70
See application file for complete search history.

(56) References Cited

U.S. PATENT DOCUMENTS

| | | | |
|---|---|---|---|
| 4,709,943 A * | 12/1987 | Yoshimura et al. | 280/751 |
| 4,978,136 A * | 12/1990 | Tomita et al. | 280/751 |
| 5,201,544 A * | 4/1993 | Matano et al. | 280/751 |
| 5,518,270 A * | 5/1996 | Hanada et al. | 280/751 |
| 5,951,045 A * | 9/1999 | Almefelt et al. | 280/748 |
| 6,086,098 A * | 7/2000 | Reiter et al. | 280/752 |
| 6,170,872 B1 * | 1/2001 | Bair et al. | 280/751 |
| 6,702,324 B2 | 3/2004 | Shimoyamada et al. | |
| 6,869,123 B2 * | 3/2005 | Marks et al. | 296/70 |
| 7,125,045 B2 * | 10/2006 | Fuks et al. | 280/748 |
| 7,140,672 B2 * | 11/2006 | Chernoff et al. | 296/192 |
| 2005/0062276 A1 * | 3/2005 | Nagata et al. | 280/752 |

FOREIGN PATENT DOCUMENTS

| | | |
|---|---|---|
| JP | 4-166449 | 6/1992 |
| JP | 7-267029 | 10/1995 |
| JP | 10-287268 | 10/1998 |
| JP | 2002-326550 | 11/2002 |

OTHER PUBLICATIONS

English language Abstract of JP4-166449.
English language Abstract of JP7-267029.
English language Abstract of JP10-287268.
English language Abstract of JP2002-326550.

* cited by examiner

*Primary Examiner*—Paul N. Dickson
*Assistant Examiner*—Joselynn Y. Sliteris
(74) *Attorney, Agent, or Firm*—Greenblum & Bernstein, P.L.C.

(57) ABSTRACT

The kinetic energy of the driver's knees is properly absorbed by a plurality of simply configured shock absorbing mechanisms, contributing to a minimization of injury to the driver's knees. A knee bolster of a vehicle comprises an upper member whose front end is secured to a cowl cross member. A lower member is in a bent plate shape configuration that is consecutively formed with a front portion, a center portion, a rear portion and a knee supporting portion. Shear pins fix a portion between the upper member and the rear portion of the lower member. A damping hole is formed on the upper member and tapers off toward the front of the vehicle. A damping protrusion is inserted into the damping hole at the rear side of the vehicle and protrudes out from the rear portion of the lower member.

7 Claims, 3 Drawing Sheets

KNEE BOLSTER OF VEHICLE

CROSS-REFERENCE TO RELATED APPLICATIONS

The present application is based on, and claims priority from, Korean Application Serial Number 10-2004-0064869, filed on Aug. 17, 2004, the disclosure of which is hereby incorporated by reference herein in its entirety.

FIELD OF THE INVENTION

The present invention relates to a vehicular knee bolster to alleviate impact on driver's knees in a vehicle collision.

BACKGROUND OF THE INVENTION

Generally, driver's knees are susceptible to injury by a front instrument panel or other components when a vehicle collision occurs.

A knee bolster is employed to alleviate the impact upon the driver's knees in the above case.

The knee bolster should support the driver's knees and properly absorb the knees' kinetic energy when the driver's knees are thrust toward the front of the vehicle during a vehicle crash.

SUMMARY OF THE INVENTION

Embodiments of the present invention are provided to reduce injury to the driver's knees by properly absorbing kinetic energy of the driver's knees by using a plurality of simply configured shock absorbing mechanisms.

A knee bolster of a vehicle comprises an upper member whose front end is secured to a cowl cross member. The upper member includes a flat panel formation that protrudes towards the rear of the vehicle. A lower member is in a bent plate shape configuration that is consecutively formed with a front portion secured to the front end of the upper member, a center portion convexly formed at a lower side of the upper member, a rear portion contacting a lower side of the upper member, and a knee supporting portion having a flat plate shape and extending downwardly from the rear portion of the lower member to make contact to the driver's knees. Shear pins fix a portion between the upper member and the rear portion of the lower member. A damping hole is formed on the upper member and tapers off toward the front of the vehicle. A damping protrusion is inserted into the damping hole at the rear side of the vehicle and protrudes out from the rear portion of the lower member.

BRIEF DESCRIPTION OF THE DRAWINGS

For a better understanding of the nature and objects of the present invention, reference should be made to the following detailed description with the accompanying drawings, in which.

DETAILED DESCRIPTION OF THE PREFERRED EMBODIMENTS

Figure 1:
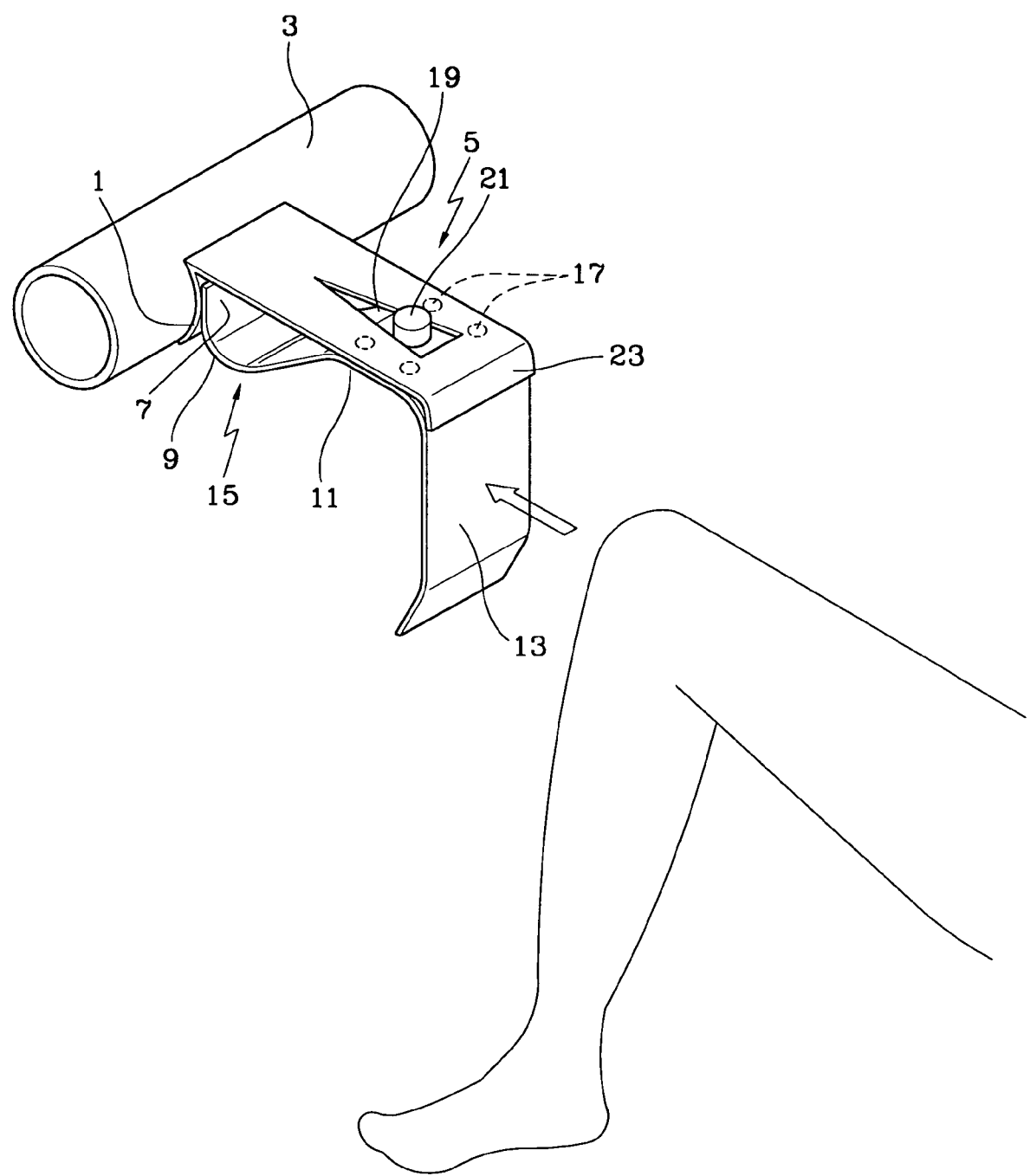
FIGS. 1 and 2 depict a knee bolster of a vehicle according to an embodiment of the present invention.
Figure 2:
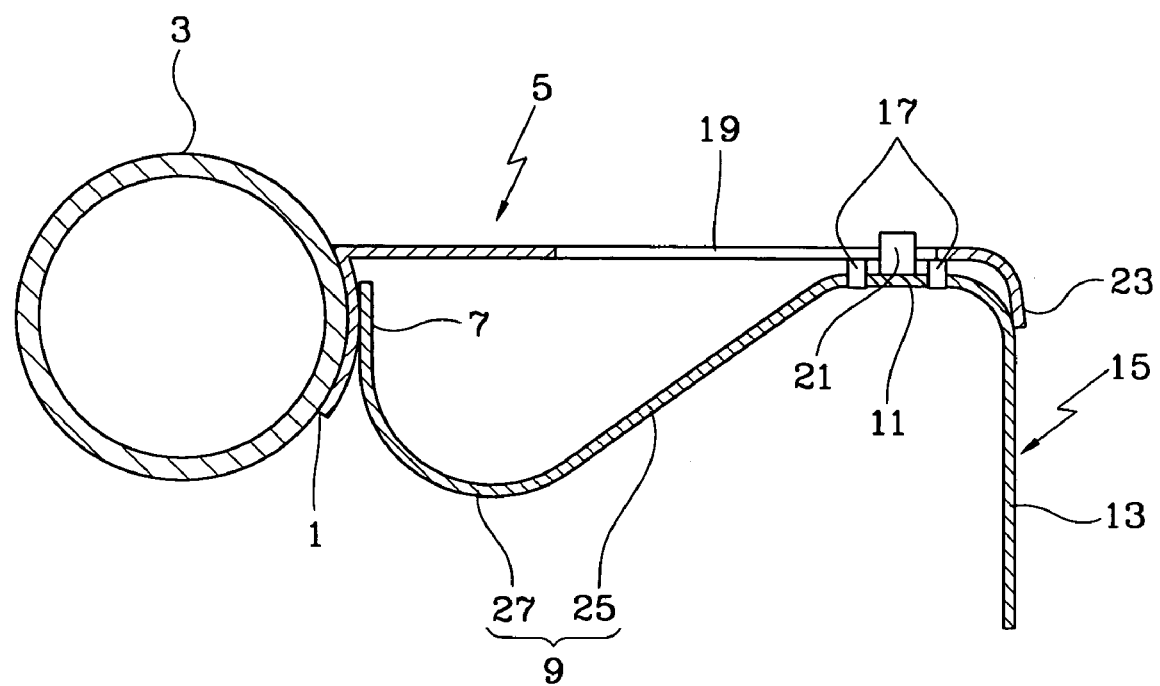

Referring now to FIGS. 1 and 2, a knee bolster of a vehicle according to an embodiment of the present invention includes an upper member 5 whose front end 1 is secured to a cowl cross member 3. The upper member 5 includes a flat panel formation that protrudes toward the rear of the vehicle. A lower member 15 is in a bent plate shape configuration that is consecutively formed by a front portion 7 secured to the front end 1 of the upper member 5, a center portion 9 convexly formed at the lower side of the upper member 5, a rear portion 11 contacting a lower side of the upper member 5, and a knee supporting portion 13 having a flat plate configuration and extending downwardly from the rear portion of the lower member to contact the driver's knees. Shear pins 17 fix a portion between the upper member 5 and the rear portion 11 of the lower member 15. A damping hole 19 is formed on the upper member 5 and tapers off toward the front of the vehicle. A damping protrusion 21 is inserted into the damping hole 19 at the rear side of the vehicle and protrudes out from the rear portion 11 of the lower member 15.

The front end 1 of the upper member 5 is bent downwardly at a contact portion to the cowl cross member 3 and fixed to the cowl cross member 3 in a state of partially enclosing the cowl cross member 3. The front portion 7 of the lower member 15 affixes to the downwardly bent front end 1 of the upper member 5.

The knee bolster according to the embodiment of the present invention can feasibly be assembled to the vehicle by only coupling the front end 1 of the upper member 5 to the cowl cross member 3.

A rear end 23 of the upper member 5 is smoothly and downwardly curved toward the knee supporting portion 13 of the lower member 15. This formation prevents injury to the driver due to the rear end 23 of the upper member 5.

The center portion 9 of the lower member 15 is constituted by a linear portion 25 and an arc portion 27. The linear portion 25 inclines downwardly toward the front of the vehicle from the rear portion 11. The arc portion 27 extends from the linear portion 25 toward the upper member 5.

When the driver's knees press the lower member 15, the linear portion 25 transmits the driver's kinetic energy to the arc portion 27 and the arc portion 27 deforms to absorb the kinetic energy.

The damping hole 19 of the upper member 5 forms an isosceles triangle whose apex faces the front of the vehicle and the base is placed toward the rear of the vehicle.

The shear pins 17 integrally protrude out from a lower side of the upper member 5 and are forcibly inserted or welded into holes formed at the rear portion 11 of the lower member 15.

Figure 3:
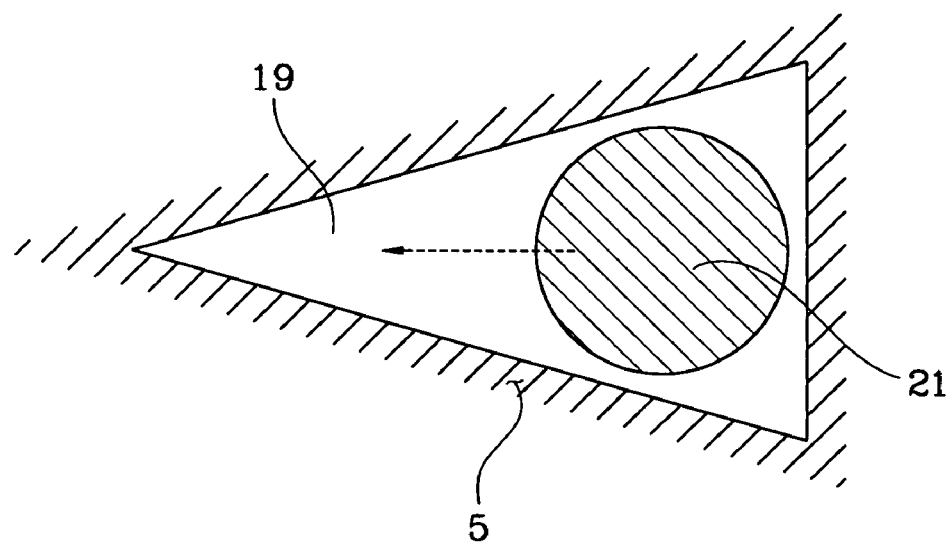
FIG. 3 illustrates a damping protrusion inserted into a damping hole.

The shear pins 17 fix the upper member 5 and the rear portion 11 of the lower member 15 to maintain the damping protrusion 21, inserted into the damping hole 19, to be distanced from the edge of the damping hole 19. In short, the damping protrusion 21 is inserted into the damping hole 19 as shown in FIG. 3.

The damping protrusion 21 is distantly located from the edge of the damping hole 19 because when the driver's knees apply kinetic energy to the knee supporting portion 13 of the lower member 15 due to the vehicle collision, the shear pins 17 are cut off to absorb the kinetic energy. Then, the damping protrusion 21 deforms the damping hole 19 for absorbing the kinetic energy.

If the damping protrusion 21 contacts or forcibly attaches to the edge of the damping hole 19, the shear pins 17 are cut off due to the kinetic energy transmitted from the knees of the driver and, simultaneously, the damping hole 19 starts to be deformed, thus causing potential injury to the driver's knees upon impact. Therefore, the kinetic energy in the present invention is sequentially absorbed during the cut-off time of the shear pins 17 and the deformation of the damping hole 19 via the damping protrusion 21.

During the overall period of cut-off time of the shear pins 17 and deformation of the damping hole 19, the center portion 9 of the lower member 15 continuously deforms and constantly absorbs the kinetic energy.

The operation of the embodiment of the present invention in the event of the vehicle collision will now be described.

When the driver's knees start to press the knee supporting portion 13, a portion between the knee supporting portion 13 and rear portion 11 of the lower member 15 bends to absorb the exterior shock. Next, when the shear pins 17 are cut off, the center portion 9 of the lower member 15 deforms to continuously absorb constant amount of kinetic energy.

After the shear pins 17 are cut off, the damping protrusion 21 provides a reaction force that gradually increases by deforming the damping hole 19, thereby absorbing more kinetic energy per unit time.

That is, the knee bolster thus constructed absorbs the impact upon the driver's knees by deformation energy of the lower member 15 (continuous and relatively constant), an energy required to sever the shear pins 17, and deformation energy that gradually increases by deforming the damping hole 19 via the damping protrusion 21. Accordingly, the knee bolster dampens out the impact upon the driver's knees by various shock absorbing mechanisms.

Figure 4:
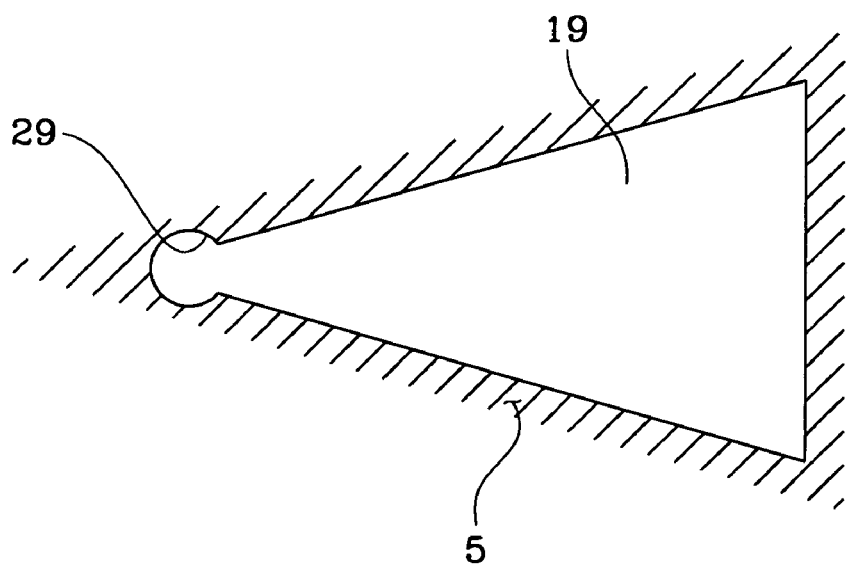
FIG. 4 illustrates a damping hole according to another embodiment of the present invention.

The damping hole 19 can have a circle 29, which is further formed to be overlapped at the apex portion of the triangle according to another embodiment of the present invention in FIG. 4.

When the damping protrusion 21 deforms the damping hole 19 toward the front of the vehicle, the stress is concentrated to the apex portion of the triangle in case of FIG. 3. This deformation may rapidly fracture the apex portion of the triangle and the deformation energy of the damping hole 19 may not gradually increase but rapidly decrease after the increase. The stress at the apex portion of the triangle is dispersed to the circle in the configuration of FIG. 4, thereby stably and gradually increasing the deformation energy of the damping hole 19 via the damping protrusion 21 by preventing rapid damage on the apex portion.

As apparent from the foregoing, there is an advantage in that the kinetic energy of the driver's knees are appropriately absorbed by a plurality of simply configured shock absorbing mechanisms, resulting in a reduction of injury to the driver's knees.

What is claimed is:

1. A knee bolster of a vehicle, comprising:
    an upper member whose front end is secured to a cowl cross member, said upper member including a flat panel formation that protrudes toward a rear of a vehicle;
    a lower member being in a bent plate shape configuration that is consecutively formed by a front portion secured to said front end of said upper member, a center portion convexly formed at a lower side of said upper member, a rear portion contacting a lower side of said upper member, and a knee supporting portion having a flat plate shape and extending downwardly from said rear portion of said lower member to make contact with the driver's knees;
    shear pins that fix a portion between said upper member and said rear portion of said lower member;
    a damping hole formed on said upper member and tapering off toward the front of the vehicle; and
    a damping protrusion inserted into said damping hole at a rear side of the vehicle and protruding out from said rear portion of said lower member.

2. The bolster as defined in claim 1, wherein said front end of said upper member is downwardly bent at a contact portion to said cowl cross member and fixed to said cowl cross member in a state of partially enclosing said cowl cross member while said front portion of said lower member attaches to a portion where said front end of said upper member is downwardly bent.

3. The bolster as defined in claim 1, wherein said center portion of said lower member comprises:
    a linear portion that downwardly inclines toward the front of the vehicle from said rear portion; and
    an arc portion that extends from said linear portion toward said upper member.

4. The bolster as defined in claim 1, wherein a rear end of said upper member is smoothly and downwardly curved toward said knee supporting portion of said lower member.

5. The bolster as defined in claim 1, wherein said damping hole of said upper member forms an isosceles triangle whose apex faces the front of the vehicle and a base thereof is placed toward the rear of the vehicle.

6. The bolster as defined in claim 1, wherein said damping hole of said upper member is in an isosceles triangle shape whose apex faces the front of the vehicle and a base is placed toward the rear of the vehicle, and a circle is further formed to be overlapped at the apex portion of said triangle.

7. The bolster as defined in claim 1, wherein said shear pins fix said upper member and said rear portion of said lower member to maintain said damping protrusion, inserted into said damping hole, to be distanced from the edge of said damping hole.

\* \* \* \* \*